United States Patent
Hong

(10) Patent No.: US 7,756,361 B2
(45) Date of Patent: Jul. 13, 2010

(54) IMAGE INTERPOLATION APPARATUS

(75) Inventor: Kihyun Hong, Yongin-si (KR)

(73) Assignee: Samsung Electronics Co. Ltd, Suwon-si (KR)

( * ) Notice: Subject to any disclaimer, the term of this patent is extended or adjusted under 35 U.S.C. 154(b) by 1182 days.

(21) Appl. No.: 11/157,942

(22) Filed: Jun. 22, 2005

(65) Prior Publication Data

US 2005/0286804 A1     Dec. 29, 2005

(30) Foreign Application Priority Data

Jun. 23, 2004     (KR) ...................... 10-2004-0047156

(51) Int. Cl.
G06K 9/32     (2006.01)
(52) U.S. Cl. ...................................... 382/300
(58) Field of Classification Search .................. 382/300
See application file for complete search history.

(56) References Cited

U.S. PATENT DOCUMENTS

| | | | | |
|---|---|---|---|---|
| 5,048,105 A | * | 9/1991 | Adachi | 382/300 |
| 5,309,484 A | * | 5/1994 | McLane et al. | 375/354 |
| 5,485,215 A | * | 1/1996 | Meyer et al. | 348/423.1 |
| 5,892,695 A | * | 4/1999 | Van Dalfsen et al. | 708/313 |
| 5,953,465 A | * | 9/1999 | Saotome | 382/300 |
| 6,091,862 A | * | 7/2000 | Okisu | 382/300 |
| 6,295,322 B1 | | 9/2001 | Arbeiter et al. | |
| 6,384,828 B1 | | 5/2002 | Arbeither et al. | |
| 6,510,254 B1 | * | 1/2003 | Nakami et al. | 382/300 |
| 6,600,495 B1 | * | 7/2003 | Boland et al. | 345/660 |
| 6,775,420 B2 | * | 8/2004 | Daly | 382/275 |
| 6,807,319 B2 | * | 10/2004 | Kovvuri et al. | 382/275 |
| 6,928,196 B1 | * | 8/2005 | Bradley et al. | 382/300 |
| 6,943,807 B2 | * | 9/2005 | Xavier | 345/606 |
| 7,151,861 B2 | * | 12/2006 | Chan et al. | 382/298 |

(Continued)

FOREIGN PATENT DOCUMENTS

| | | |
|---|---|---|
| JP | 06-303462 | 10/1994 |
| JP | 11-053537 | 2/1999 |
| JP | 2002-16820 | 1/2002 |
| WO | WO 01/52546 A2 | 7/2001 |

OTHER PUBLICATIONS

Korean Office Action dated Jan. 31, 2006 of Korean Patent Application No. 10-2004-0047156.

(Continued)

*Primary Examiner*—Bhavesh M Mehta
*Assistant Examiner*—Stephen R Koziol
(74) *Attorney, Agent, or Firm*—Stanzione & Kim LLP

(57) ABSTRACT

An image interpolation apparatus to interpolate an input image signal having a first resolution into an output image signal having a second resolution according to a predetermined resolution conversion ratio includes a frequency determiner to detect a variation in a frequency of the input image signal to determine a frequency domain that corresponds to the input image signal, a controller to calculate interpolation positions of the input image signal according to the predetermined resolution conversion ratio, a coefficient storage to store interpolation coefficients that correspond to the interpolation positions, an interpolation filter to receive the interpolation coefficients from the coefficient storage and to interpolate the input image signal accordingly, and an interpolation value corrector to correct the output image signal interpolated from the input image signal output from the interpolation filter based on information as to the frequency domain of the input image signal determined by the frequency determiner.

38 Claims, 4 Drawing Sheets

U.S. PATENT DOCUMENTS

| | | | |
|---|---|---|---|
| 7,206,027 B2 * | 4/2007 | De Haan et al. | 348/448 |
| 7,304,672 B2 * | 12/2007 | Sai et al. | 348/252 |
| 2001/0048771 A1 | 12/2001 | Sasaki | |
| 2002/0076121 A1 * | 6/2002 | Shimizu et al. | 382/300 |
| 2002/0105531 A1 | 8/2002 | Niemi | |
| 2005/0088385 A1 * | 4/2005 | Elliott et al. | 345/87 |

OTHER PUBLICATIONS

Japanese Office Action dated Dec. 21, 2007 issued in JP 2005-184162.

Dutch Search Report issued Aug. 24, 2009 in NL 1029328.

Amjed S Al-Fahoum et al.: "Combined Edge Crispiness and Statistical Differencing for Deblocking JPEG Compressed Images" IEEE Transactions on Image Processing, IEEE Service Center, Piscataway, NJ, US, deel 10, nr. 9 Sep. 1, 2001, XP011025829 ISSN: 1057-7149.

Ying Zhu et al: "Wavelet domain image interpolation via statistical estimation" Proceedings 2001 International Conference on Inage Processing. ICIP 2001. Thessaloniki, Greece, Oct. 7-10, 2001; [International Conference in Image Processing], New York, NY: IEEE, US, deel 3, Oct. 7, 2001, bladzijden 840-843, XP010563481 ISBN: 978-0-7803-6725-8.

* cited by examiner

IMAGE INTERPOLATION APPARATUS

CROSS-REFERENCE TO RELATED APPLICATIONS

This application claims the benefit of Korean Patent Application No. 2004-47156 filed Jun. 23, 2004, in the Korean Intellectual Property Office, the disclosure of which is incorporated herein by reference in its entirety.

BACKGROUND OF THE INVENTION

1. Field of the Invention

The present general inventive concept relates to an image interpolation apparatus and method, and more particularly, to an image interpolation apparatus and a method of improving characteristics of an edge portion of an image signal.

2. Description of the Related Art

In general, when an image display device receives an image having a resolution that is different from a resolution that is preset in the image display device, the image display device is required to convert the resolution of the image to match the preset resolution of the image display device.

If the resolution of the image input to the image display device is different from the preset resolution of the image display device, the resolution of the image is converted by either increasing or decreasing a number of pixels of the input image to interpolate (i.e., upscale) or decimate (i.e., downscale) the resolution of the image, respectively. The conversion of the image is typically referred to as scaling or format conversion. In particular, if an image having a lower resolution than the preset resolution of the image display device is input thereto, the image display device uses a linear interpolation method to vertically and/or horizontally upscale the lower resolution of the image to match the preset resolution.

The linear interpolation method can include a bi-linear interpolation method, a cubic convolution interpolation method, and the like. FIGS. 1A and 1B are views illustrating the bi-linear interpolation method and the cubic convolution interpolation method respectively used by a conventional image interpolation apparatus. The bi-linear interpolation method and the cubic convolution interpolation method use a finite impulse response (FIR) filter to convert an input image signal into a frequency domain and then filter the frequency domain image signal using weights of pixels that neighbor an interpolation position (i.e., a pixel being interpolated). As a result, upscaled interpolation data is output. For example, in the bi-linear interpolation method, input image signals are interpolated using 2-tab filtering as illustrated in FIG. 1A. In other words, the bi-linear interpolation method is performed using two pixels that neighbor a position to be interpolated (i.e., a pixel).

In the cubic convolution interpolation method, input image signals are interpolated using 4-tab filtering as illustrated in FIG. 1B. In other words, the cubic convolution interpolation method is performed using four pixels that neighbor a position to be interpolated. However, the conventional image interpolation apparatus typically performs interpolation using only one interpolation method (i.e., one preset filtering). Thus, image quality in each frequency domain of an image signal may deteriorate. For example, when the conventional image interpolation apparatus interpolates an input image signal using the cubic convolution interpolation method, image quality may not deteriorate in portions of the image having high frequency components. However, when the conventional image interpolation apparatus interpolates the input image signal using the bi-linear interpolation method, image quality may deteriorate in portions of the image having the high frequency components.

Most image display devices typically use the cubic convolution interpolation method, a convolution type image interpolation method (e.g., a sinc interpolation method), or both the cubic convolution interpolation method and the convolution type image interpolation method. When the image display devices selectively adopt the cubic convolution interpolation method or the sinc interpolation method to reproduce an image, it can be difficult to reduce blurring occurring in an edge portion of the image.

When the cubic convolution interpolation method is used, a ringing phenomenon hardly occurs in an edge area of an image signal but a blurring phenomenon occurs in the edge area. When the sinc interpolation method is used, a frequency characteristic is good in a low frequency domain (i.e., a domain in which a change in the image is low) but ringing may occur in the edge area. FIG. 2 is a graph illustrating response characteristics of a square wave A according to the cubic convolution interpolation method. As illustrated in FIG. 2, the cubic convolution interpolation method is used with respect to the square wave A, blurring represented by a line graph B occurs in the edge portion. Thus, image quality of the edge portion deteriorates. When the sinc interpolation method is used with respect to the square wave A, ringing represented by a line graph C occurs in the edge area.

Accordingly, when the conventional image reproducing apparatus reproduces an image by selectively using the cubic convolution interpolation method or the sinc interpolation method, it becomes necessary to determine a method of reducing a blurring that occurs in the edge portion when the cubic convolution interpolation method is used.

When the cubic convolution interpolation method is used with respect to an image signal, blurring occurs in the edge portion of the image signal. However, an 8-tab poly phase interpolation method, which is a type of sinc interpolation method, can be used to reduce blurring in the edge portion. However, in this case, ringing occurs in the edge area.

SUMMARY OF THE INVENTION

The present general inventive concept provides an image interpolation apparatus to minimize blurring occurring in an edge area of an image signal and to reduce ringing occurring in the edge area of the image signal by adopting a sinc interpolation method.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing an image interpolation apparatus to interpolate an input image signal having a first resolution into an output image signal having a second resolution according to a predetermined resolution conversion ratio, including a frequency determiner to detect a variation in a frequency of the input image signal to determine a frequency domain that corresponds to the input image signal, a controller to calculate interpolation positions of the input image signal according to the predetermined resolution conversion ratio, a coefficient storage to store interpolation coefficients that correspond to the interpolation positions, an interpolation filter to receive the interpolation coefficients from the coefficient storage and to interpolate the input image signal accordingly, and an interpolation value corrector to correct the output image signal interpolated from the input image signal output from the interpolation filter based on information as to the frequency domain of the input image signal determined by the frequency determiner.

The interpolation filter may include: a plurality of delay cells to delay the input image signal for a predetermined period of time and to output the delayed image signal, a plurality of multipliers to multiply the input image signal output from the plurality of delay cells by the interpolation coefficients output from the coefficient storage and to output a plurality of interpolation data, and an adder to add the plurality of interpolation data output from the plurality of multipliers to generate the output image signal. Interpolation values output from at least two multipliers of the plurality of multipliers may be provided to the interpolation value corrector.

The interpolation values output from the at least two multipliers may be luminance values of the input image signal.

The interpolation value corrector may calculate a difference value between the interpolation values output from the at least two multipliers and an output value of the interpolation filter and multiply the difference value by a predetermined weight to correct the interpolation values.

If an output value of the interpolation filter is larger than the interpolation values output from the at least two multipliers, the interpolation value corrector may determine the output value of the interpolation filter as being an under-shoot.

If an output value of the interpolation filter is smaller than the interpolation values output from the at least two multipliers, the interpolation value corrector may determine the output value of the interpolation filter as being an over-shoot.

The predetermined weight may be a value between "0" and "1."

The interpolation value corrector may determine the input image signal as one of a high frequency domain and a low frequency domain according to the determination made by the frequency determiner.

If the interpolation value corrector determines the input image signal is in the high frequency domain, the interpolation value corrector may select the output value of the interpolation filter as the output image signal.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1A:
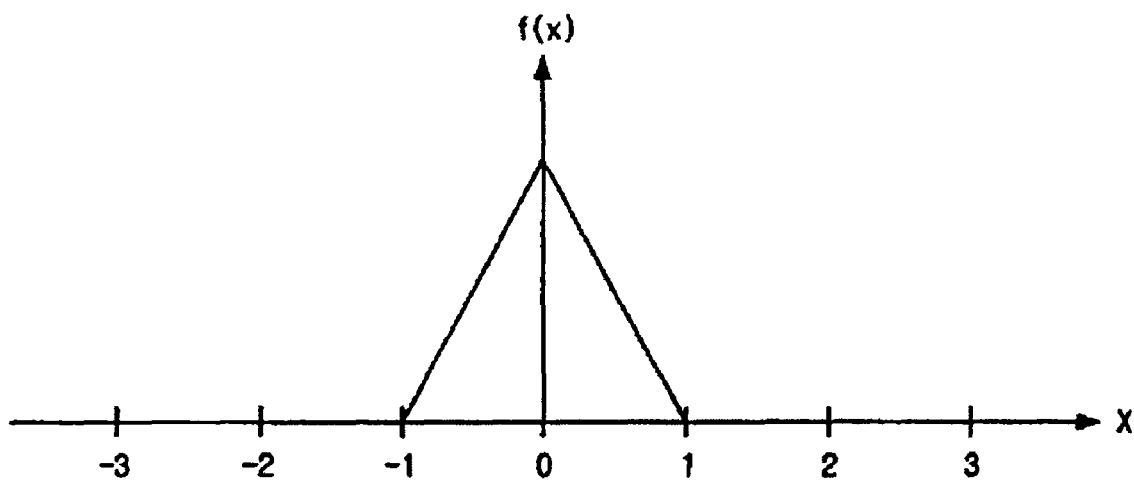
FIGS. 1A and 1B are views illustrating 2-tab filtering methods of interpolating an input image signal using a conventional image interpolation apparatus.
Figure 1B:
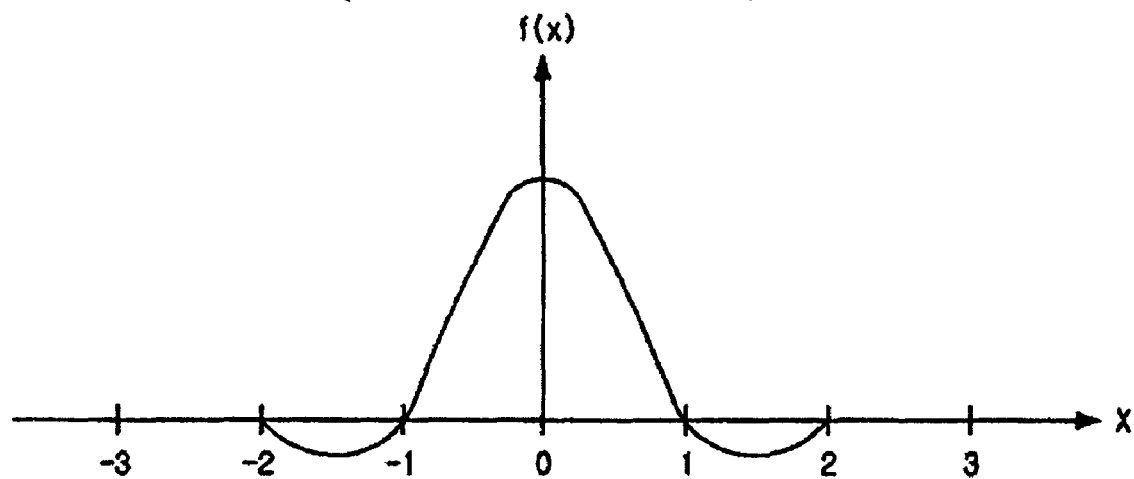
Figure 2:
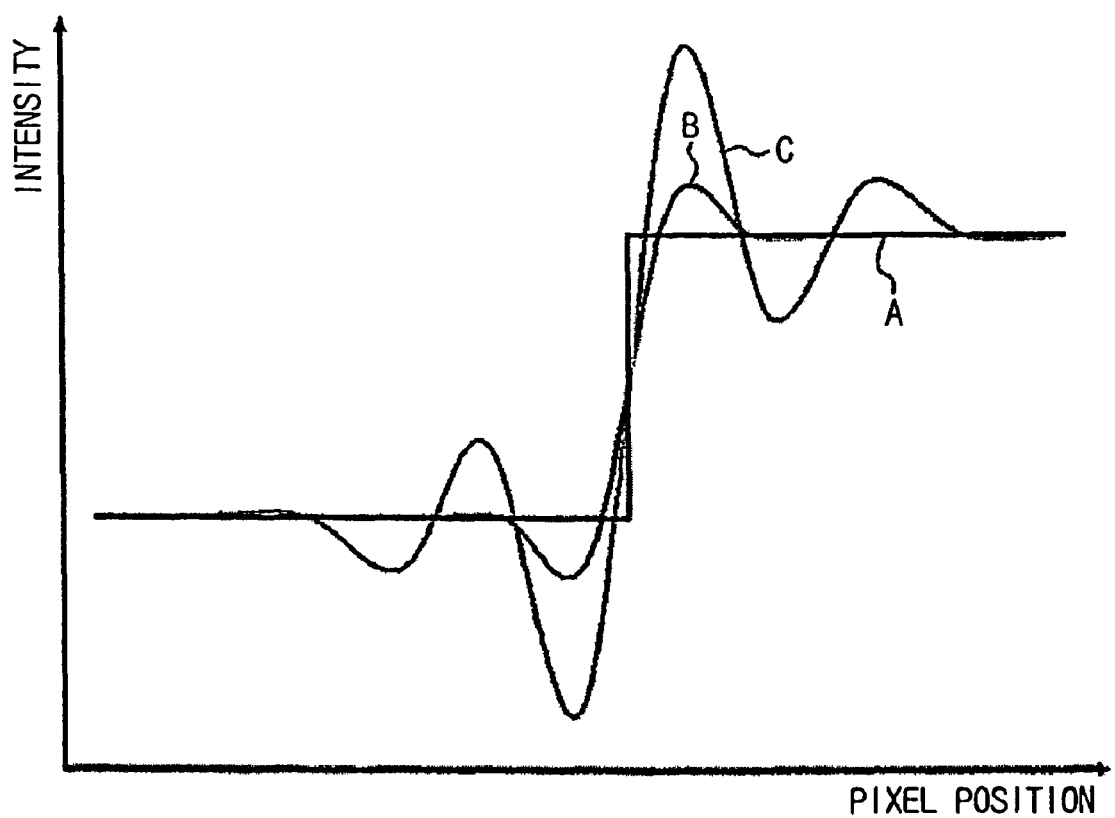
FIG. 2 is a graph illustrating response characteristics of a square wave according to a cubic convolution interpolation method.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 3:
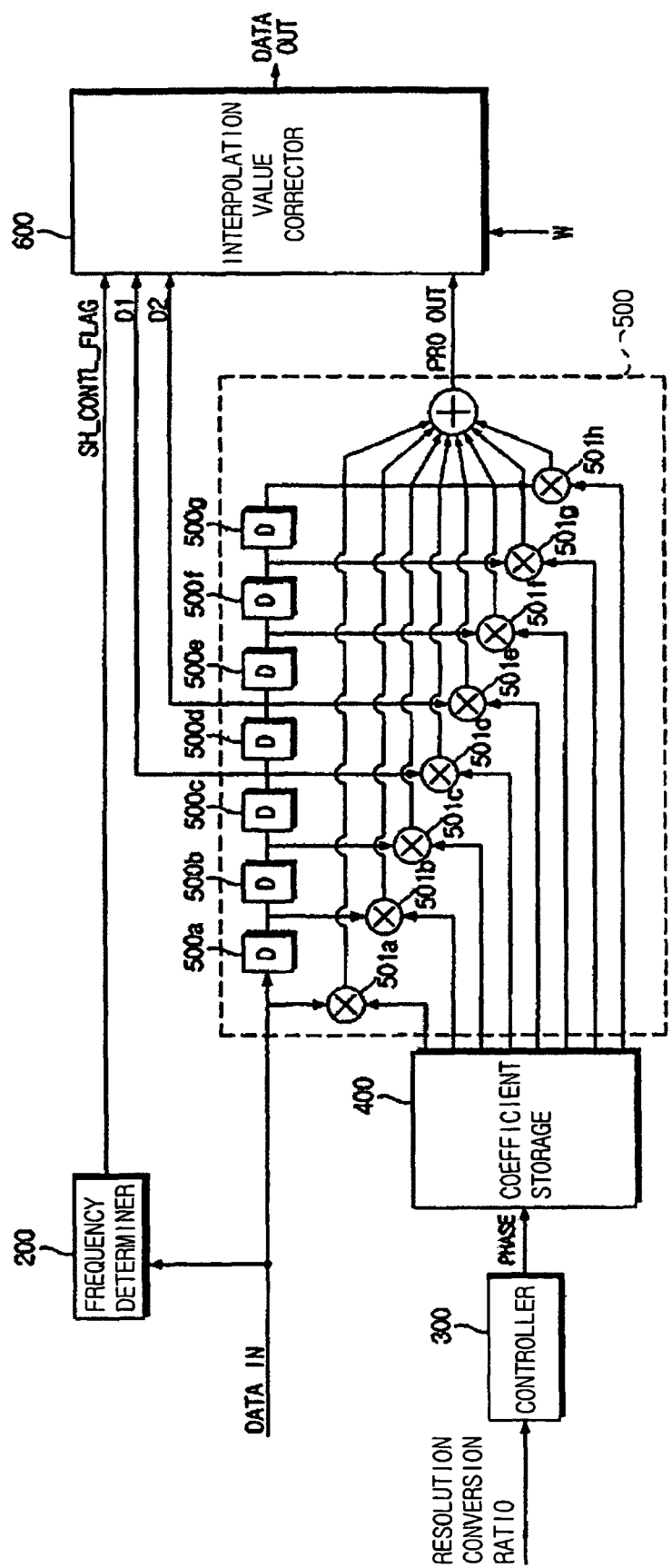
FIG. 3 is a block diagram illustrating an image interpolation apparatus according to an embodiment of the present general inventive concept.

FIG. 3 is a block diagram illustrating an image interpolation apparatus according to an embodiment of the present general inventive concept. Referring to FIG. 3, the image interpolation apparatus of the present general inventive concept includes a frequency determiner 200, a controller 300, a coefficient storage 400, an interpolation filter 500, and an interpolation value corrector 600.

In general, an apparatus that upscales a resolution of an input image signal by increasing a number of pixels using a predetermined interpolation method may be called a "scaler," a "format converter," an "image upscaler," or the like, but hereinafter, is referred to as an "image interpolation apparatus."

The controller 300 upscales or downscales an input image signal having a first resolution to an output image signal having a second resolution according to a conversion ratio of a preset resolution. In other words, the controller 300 compares a magnitude of the input image signal with a magnitude of the output image signal according to the conversion ratio of the preset resolution and selects coefficients stored in the coefficient storage 400 according to comparison result.

The coefficient storage 400 provides the coefficients selected by the controller 300 to the interpolation filter 500. The interpolation filter 500 may be an 8-tab poly phase filter. The 8-tab poly phase filter uses 8 input image signals to interpolate the output image signal from the input image signal.

The interpolation filter 500 includes a plurality of delay cells 500a through 500g and a plurality of multipliers 501a through 501h to multiply signals output from the delay cells 500a through 500g by the coefficients respectively provided by the coefficient storage 400 to the multipliers 501a through 501h. The interpolation filter 500 further adds the multiplication results and generates the output image signal from the input image signal.

The frequency determiner 200 analyzes increases and decreases of luminance levels among sequentially input image signals. The frequency determiner 200 determines the input image signals as high and low frequency domains based on a number of times luminance values of the input image signals are suddenly changed. For example, when mosaic type image signals are sequentially input to the frequency determiner 200, luminance levels of the mosaic type image signals are substantially changed several times. Thus, the frequency determiner 200 determines that the mosaic type image signals are image signals in the high frequency domain. If image signals input to the frequency determiner 200 are slightly changed or are changed at edge portions thereof, the luminance levels of the input image signals are hardly changed. Thus, the frequency determiner 200 determines that the input image signals that are hardly changed are image signals in the low frequency domain. When the frequency determiner 200 determines that the input image signals are in the low frequency domain, the frequency determiner 200 generates a control signal SH_CONTL_FLAG having a logic "high" level. When the frequency determiner 200 determines that the input image signal is in the high frequency domain, the frequency determiner 200 generates the control signal SH_CONTL_FLAG having a logic "low" level. The frequency determiner 200 transmits the control signal SH_CONTL_FLAG to the interpolation value corrector 600. Although the frequency determiner 200 has been described as generating the control signals having the logic "high" and "low" levels, it should be understood that other control signals (having different logic values) may also be used with the present general inventive concept.

The interpolation value corrector 600 corrects an interpolation value PRO OUT output from the interpolation filter 500 with reference to a value of the control signal SH_CONTL_FLAG output from the frequency determiner 200 and interpolation data output from two of the multipliers 501$a$ through 501$h$ of the interpolation filter 500. For example, the two multipliers may be 501$d$ and 501$e$. The correction of the interpolation value PRO OUT may be performed using a method illustrated by Table 1 below.

TABLE 1

```
SH_CONTL_FLAG = "ON"
   if PRO OUT > max{DI, D2} //over-shoot//
   DATA OUT = W * max {D1, D2} + (1−W) * PRO OUT
   if PRO OUT < min {DI, D2} //under-shoot//
   DATA OUT = W * min {D1, D2} + (1−W) * PRO OUT
   else
   DATA OUT = PRO OUT
SH_CONTL_FLAG = "OFF"
   DATA OUT = PRO OUT
```

As illustrated by Table 1, when the control signal SH_CONTL_FLAG output from the frequency determiner 200 is logic "high" (i.e., "ON") the interpolation value corrector 600 compares a maximum value of the interpolation data output from the multipliers 501$d$ and 501$e$ (i.e., D1 and D2) with the output interpolation value PRO OUT of the interpolation filter 500. If the output interpolation value PRO OUT of the interpolation filter 500 is greater than the interpolation data output from the multipliers 501$d$ and 501$e$ D1 and D2, the interpolation value corrector 600 adds a first value obtained by multiplying the interpolation data output from the multipliers 501$d$ and 501$e$ D1 and D2 by a weight W to a second value obtained by multiplying the output interpolation value PRO OUT of the interpolation filter 500 by a weight of 1-W. The interpolation value corrector 600 then outputs the sum of the first value and the second value as an output image signal (i.e., DATA OUT). If the output interpolation value PRO OUT of the interpolation filter 500 is less than the interpolation data output from the multipliers 501$d$ and 501$e$ D1 and D2, the interpolation value corrector 600 adds a third value obtained by multiplying a minimum value of the interpolation data output from the multipliers 501$d$ and 501$e$ D1 and D2 by the weight W and a fourth value obtained by multiplying the output interpolation value PRO OUT of the interpolation filter 500 by the weight of 1-W. The interpolation value corrector 600 then generates the sum of the third and fourth values as the output image signal DATA OUT.

An example of the operation of the interpolation value corrector 600 will now be described with reference to Table 1 above.

If luminance values of D1 and D2 (i.e., the interpolation data output from the multipliers 501$d$ and 501$e$) are respectively "100" and "110," a luminance value of the interpolation value output from the interpolation filter 500 (i.e., PRO OUT) is "130," and the weight W is "0.5," the luminance values of D1 and D2 are an overshoot compared to the output interpolation value PRO OUT of the interpolation filter 500. Thus, according to the method illustrated by Table 1 above, a first value obtained by multiplying the luminance value "110" of D2 as a maximum value of the luminance values of D1 and D2 by the weight "0.5" is added to a second value obtained by multiplying the output interpolation value PRO OUT of the interpolation filter 500 by the weight of 1-W. This can be expressed in Equation 1 below:

$$\text{DATA-OUT} = (0.5 \cdot 110) + (1 - 0.5) \cdot 130 = 120 \quad (1)$$

In other words, the output interpolation value PRO OUT of the interpolation filter 500 is reduced in order to relieve overshooting. Here, the output interpolation value PRO OUT, the interpolation data D1 and D2 of the interpolation filter 500, and the output of the interpolation value corrector 600 DATA-OUT can be luminance values.

In another example, if the luminance values of D1 and D2 (i.e., the interpolation data output from the multipliers 501$d$ and 501$e$) are respectively "140" and "130," the luminance level of the output interpolation value PRO OUT output from the interpolation filter 500 is "120", and the weight W is "0.5", the luminance values of D1 and D2 are an under-shoot compared to the output interpolation value PRO OUT of the interpolation filter 500. Thus, according to the method illustrated by Table 1 above, a third value obtained by multiplying the luminance value "130" of D2 as a minimum value of the luminance values of D1 and D2 by the weight "0.5" is added to a fourth value obtained by multiplying the output interpolation value PRO OUT of the interpolation filter 500 by the weight of 1-W. This can be expressed in Equation 2 below:

$$\text{DATA-OUT} = (0.5 \cdot 130) + (1 - 0.5) \cdot 130 = 130 \quad (2)$$

In other words, the output interpolation value PRO OUT of the interpolation filter 500 is increased to relieve under-shooting.

Figure 4:
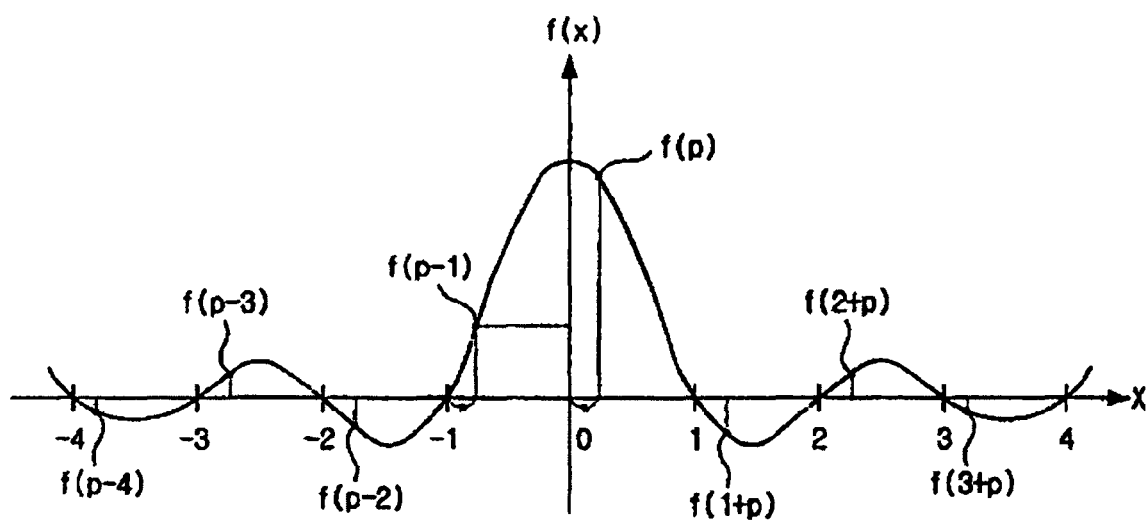
FIG. 4 is a view illustrating a method of generating interpolation coefficients according to interpolation positions calculated by a controller of the image interpolation apparatus of FIG. 3.

FIG. 4 is a view illustrating a method of generating interpolation coefficients according to interpolation positions (i.e., pixels that are to be interpolated) calculated by the controller 300 illustrated in FIG. 4. Referring to FIG. 4, in an 8-tab kernel, 8 input image signals are used in interpolation. The 8 input image signals may be sequentially related. Additionally, if a plurality of interpolation positions are (p−4), (p−3), (p−2), (p−1), (p), (p+1), (p+2), and (p+3), a plurality of interpolation coefficients to obtain final interpolation data are f(p−4), f(p−3), f(p−2), f(p−1), f(p), f(p+1), f(p+2), and f(p+3). Here, "p" denotes a relative position value between tabs.

The interpolation coefficients are calculated in advance using the 8-tab kernel and are stored in the coefficient storage 400. For example, if an interval between tabs is divided into 32 sections, interpolation positions between the tabs have relative position values of 0, $\frac{1}{32}$, $\frac{2}{32}$, $\frac{3}{32}$, . . . , $\frac{31}{32}$, and 1, and vertical and/or horizontal interpolation coefficients that correspond to the interpolation positions are pre-calculated and stored in the coefficient storage 400. Alternatively, the interval between the tabs may be divided into 16 sections, 64 sections, or the like. The calculation of interpolation positions and filter coefficients for the interpolation positions according to a conversion ratio of a preset resolution should be well known to those of ordinary skill in the art and thus will not be described in detail herein.

The various embodiments of the present general inventive concept can be embodied in software, hardware, or a combination thereof. Various embodiments can be embodied as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, DVDs, etc.). The computer readable recording medium can also be distributed over network coupled computer systems so that the computer programs are stored and executed in a distributed fashion.

As described above, in an image interpolation apparatus according to various embodiments of the present general inventive concept, a frequency of an input image signal can be considered while converting a resolution of the input image signal into another resolution to correct an output value of an interpolation filter. Thus, over-shooting and under-shooting can be reduced. Additionally, the image interpolation apparatus can calculate a difference value between interpolation data generated by the interpolation filter and the output value of the interpolation filter and multiply the difference value by a weight in order to correct the output interpolation value. As a result, a deterioration in image quality that results from over-shooting and/or under-shooting can be prevented.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image interpolation apparatus to interpolate an input image signal having a first resolution into an output image signal having a second resolution according to a predetermined resolution conversion ratio, the apparatus comprising:
   a frequency determiner to detect a variation in a frequency of the input image signal to determine a frequency domain that corresponds to the input image signal;
   a controller to calculate interpolation positions of the input image signal according to the predetermined resolution conversion ratio;
   a coefficient storage to store interpolation coefficients that correspond to the interpolation positions;
   an interpolation filter to receive the interpolation coefficients from the coefficient storage and to interpolate the input image signal accordingly; and
   an interpolation value corrector to correct the output image signal interpolated from the input image signal output from the interpolation filter based on information as to the frequency domain of the input image signal determined by the frequency determiner.

2. The image interpolation apparatus of claim 1, wherein the interpolation filter comprises:
   a plurality of delay cells to delay the input image signal for a predetermined period of time and to output the delayed image signal;
   a plurality of multipliers to multiply the input image signal output from the plurality of delay cells by the interpolation coefficients output from the coefficient storage and to output a plurality of interpolation data; and
   an adder to add the plurality of interpolation data output from the plurality of multipliers to generate the output image signal,
   wherein interpolation values output from at least two multipliers of the plurality of multipliers are provided to the interpolation value corrector.

3. The image interpolation apparatus of claim 2, wherein the interpolation values output from the at least two multipliers are luminance values of the input image signal.

4. The image interpolation apparatus of claim 2, wherein the interpolation value corrector calculates a difference value between the interpolation values output from the at least two multipliers and an output value of the interpolation filter, and multiplies the difference value by a predetermined weight to correct the interpolation values.

5. The image interpolation apparatus of claim 4, wherein if an output value of the interpolation filter is larger than the interpolation values output from the at least two multipliers, the interpolation value corrector determines the output value of the interpolation filter as being an under-shoot.

6. The image interpolation apparatus of claim 4, wherein if an output value of the interpolation filter is smaller than the interpolation values output from the at least two multipliers, the interpolation value corrector determines the output value of the interpolation filter as being an over-shoot.

7. The image interpolation apparatus of claim 4, wherein the predetermined weight is a value between "0" and "1."

8. The image interpolation apparatus of claim 1, wherein the interpolation value corrector determines the input image signal as one of a high frequency domain and a low frequency domain according to the determination made by the frequency determiner.

9. The image interpolation apparatus of claim 8, wherein if the interpolation value corrector determines that the input image signal is in the high frequency domain, the interpolation value corrector selects an output value of the interpolation filter as the output image signal.

10. An image interpolation apparatus, comprising:
    a frequency determiner to detect frequency information of an input image signal;
    an interpolation unit to interpolate an output image signal from the input image signal;
    and
    an interpolation value adjustment unit to adjust values of the output by the interpolation unit according to the frequency information detected by the frequency determiner,
    wherein the input image signal includes a plurality of sequential image signal portions, and the frequency information detected by the frequency determiner includes whether the input image signal is in a high frequency domain or a low frequency domain,
    wherein the interpolation value adjustment unit adjusts the values of the output image signal when the input image signal is detected to be in the low frequency domain, and
    wherein the frequency information measures how often luminance values in the input image signal are suddenly changed.

11. An image interpolation apparatus comprising:
    a frequency determiner to detect frequency information of an input image signal;
    an interpolation unit to interpolate an output image signal from the input image signal;
    an interpolation value adjustment unit to adjust values of the output image signal output by the interpolation unit according to the frequency information detected by the frequency determiner; and
    a coefficient unit to determine interpolation positions of the input image signal according to the image resolution and the preset resolution and to provide a plurality of interpolation coefficients to the interpolation unit.

12. The image interpolation apparatus of claim 11, wherein the input image signal is divided into 8 portions to be interpolated by the interpolation unit, and the coefficient unit determines 8 corresponding interpolation coefficients using an 8-tab kernel function.

13. The image interpolation apparatus of claim 12, wherein the 8-tab kernel function determines the 8 corresponding interpolation coefficients according to $f(p-4)$, $f(p-3)$, $f(p-2)$, $f(p-1)$, $f(p)$, $f(p+1)$, $f(p+2)$, and $f(p+3)$, where "$f(\ )$" represents the 8-tab kernel function and "p" represents a relative position value between tabs of the 8-tab kernel function.

14. The image interpolation apparatus of claim 11, wherein the coefficient unit comprises a storage unit to pre-store the plurality of interpolation coefficients.

15. The image interpolation apparatus of claim 11, wherein the interpolation unit comprises:
- a plurality of multipliers arranged in parallel to multiply portions of the input image signal by corresponding ones of the plurality of interpolation coefficients provided by the coefficient unit; and
- an adding unit to add the plurality of portions of the input image signal that are multiplied by the corresponding interpolation coefficients to obtain the values of the output image signal.

16. The image interpolation apparatus of claim 15, wherein the plurality of portions of the input image signal are temporally related, and the image interpolation unit further comprises:
- a plurality of delay cells to receive the corresponding plurality of portions of the input image signal and to delay the corresponding portions of the input image signal such that the plurality of portions of the image signal are synchronized.

17. The image interpolation apparatus of claim 11, wherein the interpolation unit individually interpolates a plurality of sequential portions of the input image signal and provides one or more interpolation values that correspond to one or more of the plurality of sequential portions to the interpolation value adjustment unit.

18. The image interpolation apparatus of claim 17, wherein the interpolation value adjustment unit compares the one or more interpolation values provided by the interpolation unit to the values of the output image signal to determine whether an undershoot or an overshoot occurs in the values of the output image signal.

19. The image interpolation apparatus of claim 18, wherein the interpolation value adjustment unit increases the values of the output image signal by a weighted difference between the one or more interpolation values provided by the interpolation unit and the values of the output image signal when the undershoot occurs in the values of the output image signal, and decreases the values of the output image signal by the weighted difference between the one or more interpolation values provided by the interpolation unit and the values of the output image signal when the overshoot occurs in the values of the output image signal.

20. An image interpolation apparatus to interpolate an input image signal, comprising:
- an interpolation unit to determine an output image signal from a plurality of interpolations of a plurality of portions of the input image signal; and
- an interpolation value adjustment unit to adjust luminance values of the output image signal when the input image signal is in a low frequency domain by increasing the luminance values of the output image signal received from the interpolation unit when the luminance values of the output image signal are less than one or more selected interpolated luminance values, and decreasing the luminance values of the output image signal received from the interpolation unit when the luminance values of the output image signal are greater than the one or more selected interpolated luminance values.

21. The image interpolation apparatus of claim 20, wherein the luminance values of the output image signal received from the interpolation unit are adjusted when the input image signal is determined to be a mosaic type image signal and the luminance values of the output image signal received from the interpolation unit are not adjusted when the input image signal is in the high frequency domain.

22. The image interpolation apparatus of claim 20, wherein the interpolation value adjustment unit adjusts the luminance values of the output image signal according to:

$$\text{DATA OUT}=W*\max\{D1,D2\}+(1-W)*\text{PRO OUT},$$
when PRO OUT>max{D1,D2}, and $$\text{DATA OUT}=W*\min\{D1,D2\}+(1-W)*\text{PRO OUT},$$
when PRO OUT<min{D1,D2} where DATA OUT represents the adjusted luminance values of the output image signal, W represents a predetermined weight, max( ) represents a maximum value function, min( ) represents a minimum value function, D1 and D2 represent the one or more selected interpolated luminance values, and PRO OUT represents the luminance values of the output image signal received from the interpolation unit.

23. The image interpolation apparatus of claim 20, wherein the interpolation unit scales the input image signal having a first resolution to a second resolution that matches a preset resolution of an image display device.

24. An image interpolation apparatus to scale an input image signal having a corresponding resolution to match a preset resolution of an image display device, the apparatus comprising:
- an interpolation unit to receive a plurality of portions of the input image signal, to interpolate the plurality of portions of the image signal according to a plurality of corresponding interpolation coefficients, and to output a first output including values of an output image signal and a second output including one or more interpolation values selected from the plurality of interpolated portions of the input image signal; and
- an adjustment unit to receive the first output and the second output and to compare the first output with the second output to determine whether the first output should be adjusted to compensate for an overshoot or an undershoot.

25. A method of interpolating an image, the method comprising:

detecting frequency information of an input image signal;

interpolating an output image signal from the input image signal; and adjusting values of the output image signal according to the frequency information, wherein the input image signal includes a plurality of sequential image signal portions, and the detected frequency information includes whether the input image signal is in a high frequency domain or a low frequency domain, wherein the adjusting of the values of the output image signal comprises adjusting the values of the output image signal when the input image signal is detected to be in the low frequency domain, and wherein the frequency information measures how often luminance values in the input image signal are suddenly changed.

26. A method of interpolating an image, the method comprising:

detecting frequency information of an input image signal;

interpolating an output image signal from the input image signal;

adjusting values of the output image signal according to the frequency information; and determining interpolation positions of the input image signal according to the image resolution and the preset resolution and selecting a plurality of interpolation coefficients.

27. The method of claim 26, wherein the input image signal is divided into 8 portions to be interpolated, and the selecting of the plurality of interpolation coefficients comprises determining 8 corresponding interpolation coefficients using an 8-tab kernel function.

28. The method of claim 27, wherein the 8-tab kernel function determines the 8 corresponding interpolation coefficients according to $f(p-4)$, $f(p-3)$, $f(p-2)$, $f(p-1)$, $f(p)$, $f(p+1)$, $f(p+2)$, and $f(p+3)$, where "$f(\ )$" represents the 8-tab kernel function and "p" represents a relative position value between tabs of the 8-tab kernel function.

29. The method of claim 26, further comprising:
pre-storing the plurality of interpolation coefficients.

30. The method of claim 26, wherein the interpolating of the output image signal comprises:
multiplying portions of the input image signal by corresponding ones of the plurality of interpolation coefficients; and
adding the plurality of portions of the input image signal that are multiplied by the corresponding interpolation coefficients to obtain the values of the output image signal.

31. The method of claim 30, wherein the plurality of portions of the input image signal are temporally related, and the interpolating of the output image signal further comprises:
before multiplying the portions of the input image signal by the corresponding plurality of interpolation coefficients, delaying the corresponding portions of the input image signal such that the plurality of portions of the image signal are synchronized.

32. The method of claim 26, wherein the interpolating of the output image signal comprises individually interpolating a plurality of sequential portions of the input image signal and selecting one or more interpolation values that correspond to one or more of the plurality of sequential portions to determine an adjustment amount.

33. The method of claim 32, wherein the adjusting of the values of the output image signal comprises comparing the selected one or more interpolation values to the values of the output image signal to determine whether an undershoot or an overshoot occurs in the values of the output image signal.

34. The method of claim 33, wherein the adjusting of the values of the output image signal further comprises increasing the output values of the output image signal by a weighted difference between the selected one or more interpolation values and the values of the output image signal when the undershoot occurs in the values of the output image signal, and decreasing the values of the output image signal by the weighted difference between the selected one or more interpolation values and the values of the output image signal when the overshoot occurs in the values of the output image signal.

35. A method of interpolating an input image signal, the method comprising:
determining an output image signal from a plurality of interpolations of a plurality of portions of the input image signal; and
adjusting luminance values of the output image signal when the input image signal is in a low frequency domain by increasing the luminance values of the output image signal when the luminance values of the output image signal are less than one or more selected interpolated luminance values, and decreasing the luminance values of the output image signal when the luminance values of the output image signal are greater than the one or more selected interpolated luminance values.

36. The method of claim 35, wherein the luminance values of the output image signal are adjusted when the input image signal is determined to be a mosaic type image signal and the luminance values of the output image signal received from the interpolation unit are not adjusted when the input image signal is in the high frequency domain.

37. The method of claim 35, wherein the luminance values of the output image signal are adjusted according to:

$$\text{DATA OUT} = W * \max\{D1, D2\} + (1-W) * \text{PRO OUT}$$
when PRO OUT>max{D1,D2}, and $$\text{DATA OUT} = W * \text{mm}\{D1, D2\} + (1-W) * \text{PRO OUT}$$
when PRO OUT<min{D1,D2} where DATA OUT represents the adjusted luminance values of the output image signal, W represents a predetermined weight, max( ) represents a maximum value function, min( ) represents a minimum value function, D1 and D2 represent the one or more selected interpolated luminance values, and PRO OUT represents the luminance values of the output image signal.

38. A computer readable medium containing executable code to scale an input image signal having a corresponding resolution to match a preset resolution of an image display device, the medium comprising:
a first executable code to receive a plurality of portions of the input image signal, to interpolate the plurality of portions of the image signal according to a plurality of corresponding interpolation coefficients, and to output a first output including values of an output image signal and a second output including one or more interpolation values selected from the plurality of interpolated portions of the input image signal; and
a second executable code to receive the first output and the second output and to compare the first output with the second output to determine whether the first output should be adjusted to compensate for an overshoot or an undershoot.

* * * * *